US007542992B1

(12) United States Patent
Pandurangan et al.

(10) Patent No.: US 7,542,992 B1
(45) Date of Patent: Jun. 2, 2009

(54) ASSIMILATOR USING IMAGE CHECK DATA

(75) Inventors: Vijay Pandurangan, San Francisco, CA (US); David Reiss, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 221 days.

(21) Appl. No.: 11/194,230

(22) Filed: Aug. 1, 2005

(51) Int. Cl.
G06F 7/00 (2006.01)
G06F 12/00 (2006.01)
G06F 17/00 (2006.01)

(52) U.S. Cl. .................. 707/104.1; 707/203; 707/204

(58) Field of Classification Search ................ None
See application file for complete search history.

(56) References Cited

U.S. PATENT DOCUMENTS

| 5,608,865 | A | * | 3/1997 | Midgely et al. ............... 714/1 |
| 5,745,669 | A | * | 4/1998 | Hugard et al. ................ 714/3 |
| 6,202,070 | B1 | * | 3/2001 | Nguyen et al. ............... 707/10 |
| 6,647,400 | B1 | * | 11/2003 | Moran ........................ 707/205 |
| 6,704,755 | B2 | * | 3/2004 | Midgley et al. .............. 707/10 |
| 6,785,786 | B1 | * | 8/2004 | Gold et al. .................. 711/162 |
| 7,024,581 | B1 | * | 4/2006 | Wang et al. .................. 714/2 |
| 7,100,072 | B2 | * | 8/2006 | Galipeau et al. .............. 714/6 |
| 7,376,945 | B1 | * | 5/2008 | Kakumani et al. .......... 717/171 |
| 7,379,967 | B2 | * | 5/2008 | Izutsu et al. ................. 709/204 |
| 2002/0038296 | A1 | * | 3/2002 | Margolus et al. ......... 707/104.1 |
| 2003/0204529 | A1 | * | 10/2003 | Hertling et al. ............. 707/200 |
| 2004/0003266 | A1 | * | 1/2004 | Moshir et al. ............... 713/191 |
| 2004/0034663 | A1 | * | 2/2004 | Noguchi .................... 707/104.1 |
| 2004/0167903 | A1 | * | 8/2004 | Margolus et al. ............. 707/10 |
| 2004/0167938 | A1 | * | 8/2004 | Margolus et al. ............ 707/203 |
| 2004/0167939 | A1 | * | 8/2004 | Margolus et al. ............ 707/203 |
| 2004/0167940 | A1 | * | 8/2004 | Margolus et al. ............ 707/203 |
| 2004/0167943 | A1 | * | 8/2004 | Margolus .................... 707/204 |
| 2004/0267696 | A1 | * | 12/2004 | Brown et al. ................... 707/1 |
| 2005/0071390 | A1 | * | 3/2005 | Midgley et al. ............. 707/204 |
| 2005/0203851 | A1 | * | 9/2005 | King et al. ..................... 705/51 |
| 2005/0273858 | A1 | * | 12/2005 | Zadok et al. .................. 726/24 |
| 2005/0281469 | A1 | * | 12/2005 | Anderson et al. ............ 382/232 |
| 2005/0289181 | A1 | * | 12/2005 | Deninger et al. ......... 707/104.1 |
| 2006/0020662 | A1 | * | 1/2006 | Robinson .................... 709/203 |

(Continued)

FOREIGN PATENT DOCUMENTS

KR       2005074816 A  *  7/2005

OTHER PUBLICATIONS

Anderson et al., "Serverless Network File Systems", Feb. 1996, ACM Transactions on Computer Systems, p. 41-79.*

(Continued)

*Primary Examiner*—Hosain T Alam
*Assistant Examiner*—Joseph D Wong
(74) *Attorney, Agent, or Firm*—Sterne, Kessler, Goldstein & Fox P.L.L.C.

(57) ABSTRACT

An assimilator ensures that a multitude of client computers have the correct data stored in their memory. A daemon process continuously produces checksums of the client's files. A master assembles a set of checksums corresponding to files the client should have. Comparing the checksums reveals corrupt files and nonexistent files on the client. The client can download correct files from image servers that store images of partial and complete file systems.

16 Claims, 12 Drawing Sheets

U.S. PATENT DOCUMENTS

2006/0123010 A1* 6/2006 Landry et al. ............... 707/10
2007/0022264 A1* 1/2007 Bromling et al. ............ 711/162
2007/0027936 A1* 2/2007 Stakutis et al. ............. 707/204

OTHER PUBLICATIONS

Huang et al., "Cheap Recovery: A Key to Self-Managing State", Dec. 2004, ACM Transactions on Storage, p. 38-70.*

HP-UX, "tar(1)—tape file archiver", Jun. 2002, HP-UX 11i Version 1.6, hereinafter Tar, p. 1-5.*

Androutsellis-theotokis, et al., "A Survey of Peer-to-Peer Content Distribution Technologies", Dec. 2004, ACM Computing Surveys, vol. 36, No. 4, p. 335-371.*

Crosse et al., "P2P Networks: Napster", Mar. 2002, Retrieved from <<http://ntrg.cs.tcd.ie/undergrad/4ba2.02-03/p4.html>> on Jun. 15, 2006.*

Creedon et al., "P2P Networks: Gnutella", Mar. 2002, Retrieved from <<http://ntrg.cs.tcd.ie/undergrad/4ba2.02-03/p4.html>> on Jun. 15, 2006.*

Chang et al, "Mimic: Raw Activity Shipping for File Synchronization in Mobile File Systems", Jun. 6, 2004, MobiSys' 04, ACM Press, p. 165-176.*

Muthitacharoen et al, "A Low-bandwidth Network File System", Oct. 2001, ACM Press, p. 174-187.* www.oed.com, "Pull, v.", "Entry printed from Oxford English Dictionary Online", Jun. 2008, p. 1-64.* www.oed.com, "Obtain, v.", "Entry printed from Oxford English Dictionary Online", Jun. 2008, p. 1-6.*

Williamson et al, "Ant Developers Handbook", Aug. 2002, Sam's Publishing, p. 1, 166.*

Devarankonda et al, "Recovery in the Calypso File System", Aug. 1996, ACM Transactions on Computer Systems, vol. 14, No. 3, p. 287-310.*

Castro et al, "Practical Byzantine Fault Tolerance and Proactive Recovery", Nov. 2002, ACM Transactions on Computer Systems, vol. 20, No. 4, p. 398-461.*

Loguinov et al, "Graph-Theoretic Analysis of Structured Peer-to-Peer Systems: Routing Distances and Fault Resilience", Oct. 2005, IEEE/ACM TRansactions on Networking, vol. 13, No. 5, p. 1107-1120.*

Wiki.theory.org, "BitTorrent Protocol Specification v1.0", Sep. 2006, From TheoryORg, <Retrieved Jun. 22, 2008>.*

\* cited by examiner

ASSIMILATOR USING IMAGE CHECK DATA

TECHNICAL FIELD

Embodiments relate to the fields of computer administration, computer networks, and computer clusters. Embodiments also relate to distributing, monitoring, and repairing the file system images of a network of client computers.

BACKGROUND

A computer is a machine that has a processor, memory, and other parts. Computer memories contain data. Some of the data are computer programs and other data are information that can be operated on or accessed by a computer program. Most computers contain two types of memory: volatile, which forgets data when not energized, and non-volatile, which does not forget data when not energized.

When a computer is first started, the processor executes a series of computer programs stored in non-volatile memory. In many instances, the processor loads a program before executing it. Loading means copying all or part of the computer program from non-volatile memory into volatile memory. A computer connected to a computer network can also load a computer program from another computer on the network into its own volatile memory. The program or set of programs the computer loads first is usually the operating system. The operating system supplies resources to and coordinates resource sharing among all the programs that the computer is running. Some programs are designed to run continuously and perform a task without most users being aware that the program is running. When the service is not beneficial to the user, it is often called a virus. When it is beneficial, such as a virus scanner, it can be called a daemon.

A non-volatile memory contains data. The data is meaningless without a computer program to interpret it. Most computers have an operating system that interprets some, or all, of the non-volatile memory contents as a file system. A file system is often thought-of as a hierarchical arrangement of directories and files. In reality, most file systems have at least three kinds of files and some extra information for keeping track of things. The three kinds of files are regular files, directory files, and special files.

Regular files contain data and are neither special files nor directories. Directory files, also called "directories", contain directory data. Directory data includes information about descendant files. Special files come in many varieties with many uses. For example, some special files can be used for accessing devices, such as hard drives, keyboards, and graphics chips. Other special files can be used for accessing services offered by the operating system, such as pipes. Special files also provide for capabilities like soft linking (also known as symbolic linking).

Every file in a file system usually has other information associated with it. For clarity, this other information will be called "I-nodes" (short for information node) because that is what it is called in the UNIX operating system and its progeny. Other operating systems give it other names. Every file has at least one I-node. An I-node is associated with only one file. I-nodes are not part of the file data. I-nodes can include data informing the computer where the file data are located. I-nodes can include other data such as regarding file permissions, ownership, creation time, and last modification time.

Directory files, mentioned earlier, contain information about descendent files. Oftentimes, a directory's information about a file is a directory entry that pairs a filename with an I-node reference. A user sees the filename and can choose to open the file. When the file is opened, the operating system uses the I-node reference to find the file's first I-node. Then it examines the I-node to determine the file type, permissions, and other information. When more than one directory entry, even entries in different directories, contains the same I-node reference, the file data is "hard linked". A hard link is different from a soft link because soft links typically are implemented using special files while hard links use directory entries.

As mentioned earlier, computer memory, including non-volatile memory contains data. As also mentioned earlier, files can have file data. The difference between a file and a memory is that a memory is a physical device giving little if any structure to the data. The memory can contain files, directories, portions of files, portions of directories, or nothing without understanding those contents. A file is structured data held in the computer memory where the structure is defined by people and implemented by a computer program.

For example, a brand new computer hard drive is a non-volatile computer memory containing nothing. A computer can use the hard drive to hold files and directories. The files and directories are structured data held on the hard drive and the structure is implemented by the computer operating system. A computer can also treat the hard drive itself as a single file called a device file or a raw device file.

Metadata is generally defined as data about data; hence file metadata is information about a file. As discussed earlier, a file system can contain regular files, directory files, and special files. Each file has at least one I-node and can contain file data. An I-node can contain data about the file such as file creation date, last modification date, who created it, who can access it, and what kind of file it is. This data can be file metadata. As such, a file system consists of file data and file metadata. A collection of file data and file metadata is called an image. The image of a file system can be used to create a duplicate file system or to recover a file system that is lost or destroyed. Furthermore, the metadata can also contain data that is not normally contained in an I-node, such as a checksum or a digital signature.

One of the problems often encountered in computer administration is ensuring that a computer memory contains the correct data. The files and other objects in memory, such as those held on a hard drive, can become corrupted. Sources of corruption include: computer viruses; malicious, inattentive, or untrained users; hardware failure or degradation over time; and upgrades to the set of correct files. One way to detect a corrupt file is to compare it to a known good copy. A byte by byte or word by word comparison can detect corruption as well as where in the file the corruption lies.

Another way to detect file corruption is to use a file checksum. A file checksum is a number that is calculated based on the data held in the file. Two files with the same contents will have the same checksum. When two files that are different can have the same checksum, it is called a collision. Some people are motivated to intentionally create collisions. Historically, many checksum algorithms have been developed to avoid both intentional and unintentional collisions. Unintentional collisions are exceedingly rare. The various checksum algorithms are widely known and available.

The advantage of a checksum over a byte by byte comparison is that a checksum is a relatively small datum. For example, one of the popular current checksum algorithms gives a number that is 256 bits long. Checksums are small enough to be treated as file metadata, although current operating systems rarely use them. Byte by byte comparison requires a complete copy of the file under scrutiny, which can be many gigabytes long. Furthermore, a cryptographically secure and signed checksum can be distributed with a file so that anyone can verify that the file is not corrupted. A complete copy of the file, even if received from a trusted source, is not cryptographically secure. A trusted source is a computer or other data source that is known to provide the correct data and to never supply a corrupted copy. Trusted servers, digital signatures, secure checksums, key exchanges, and other fundamentals of secure or trusted data storage and data exchange are well known to those practiced in the arts of secure computing, encryption, and cryptography. Checksums are also commonly used to verify data integrity in other protocols, such as rsync.

Data, such as files and images, can be distributed in a variety of ways. Some of the ways involving transport of physical media are via floppy disk, compact disk, digital video disk, magnetic tape, and disk drive. Other ways involve using client-server exchanges over communications networks as are standardized by Internet protocols such as HTTP, FTP, TCP, UDP and others. Data can also be transmitted securely, meaning no one can tamper with, spoof, or intercept it. More recent development are peer-to-peer networks (PTP) and TORRENT files (torrents).

In PTP, a client requests data from the PTP network. In a centralized PTP network, such as the original NAPSTER network, the client sends the request to a central index server. The central index server responds by telling the client where to go to get the data. In a decentralized PTP network, the client asks another computer on the network for the data. If that computer does not have or know where to get the data, it then it forwards the request to other computers on the network. The request can be repeatedly forwarded until the data is found or the search is given up. If the data is found, then the client is told where to go to get the data. In both centralized PTP and decentralized PTP networks, the client often receives many different places to get the data from and chooses one of them.

TORRENT files (torrents), such as those implemented with the BITTORRENT software, are special implementations of PTP. A torrent client receives many places from which to retrieve all or part of the data. The client can then retrieve different parts of the data from different computers and can do it simultaneously. The central index server mediates the exchange of data between the client and the other computers on the network. In a decentralized architecture, the central index server is replaced by a decentralized database that carries information for mediating the data exchange.

Among the problems that arise in administering computers is ensuring that the correct data are present in the computer memory. The data can be corrupted intentionally or unintentionally. It can be uncorrupted, but out of date. Regardless, if the computer has the wrong data in memory, repairing or updating the data contained in a single computer is a tedious chore that is error-prone. In some computing environments, hundreds, thousands, or even hundreds of thousands of computers must be maintained. The human cost of such maintenance is tremendous. Automatic maintenance is usually restricted to causing all of the computers to load, via a network connection, a common image of the operating system, other programs, and data. A problem computer is shut down and restarted such that it receives a fresh image. Such schemes can be effective, but are limiting.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

One aspect of the embodiments to overcome the shortcomings of current technology is by storing multiple images on multiple image servers. Different images have different image identifiers because they include different files and different image metadata. Different images can be stored on and served from different image servers. Furthermore, copies of the different images can be stored on different image servers so that there are multiple servers from which an image can be obtained.

Another aspect of the embodiments is that a client image specification is associated with every client. The client image specification contains information specifying how to combine the images into a cumulative image. The cumulative image can be loaded onto a client at which time the client's effective image is an exact duplicate of the cumulative image. Each client has a single effective image in its memory. As the client runs, its effective image can change such that the client's effective image is no longer a duplicate of the cumulative image that was originally loaded.

Yet another aspect of the embodiments is that the client image specification can be used, along with the images, to create cumulative image check data. The cumulative image check data can include a checksum for some of the files, or even every file, in the cumulative image.

A yet further aspect of the embodiments is to generate effective image check data based on the files that the client actually has stored in memory. A client can generate effective image check data based on the effective image in its own memory.

An additional aspect of the embodiments is comparing the effective image check data to the cumulative image check data. A client side comparison occurs when the cumulative image check data is sent to a client and the client compares it to the effective image check data. A server side comparison occurs when the comparison is made on a computer other than the client. The comparison finds differences between the effective image check data and the cumulative image check data and those differences are recorded.

BRIEF DESCRIPTION OF THE DRAWINGS

The particular values and configurations discussed in these non-limiting examples can be varied and are cited merely to illustrate one or more embodiments and are not intended to limit the scope thereof.

DETAILED DESCRIPTION

The particular values and configurations discussed in these non-limiting examples can be varied and are cited merely to illustrate embodiments and are not intended to limit the scope of the invention.

Overview

An assimilator ensures that a multitude of client computers have the correct data stored in their memory. A daemon process continuously produces effective image check data. A master assembles cumulative image check data. Comparing the effective image check data to the cumulative image check data reveals corrupt files, files that should exist but do not, and files that do exist but should not. The client can download correct files from image servers that store images of partial and complete file systems. The client can also download correct files from peers.

Environment and Architecture

Figure 1:
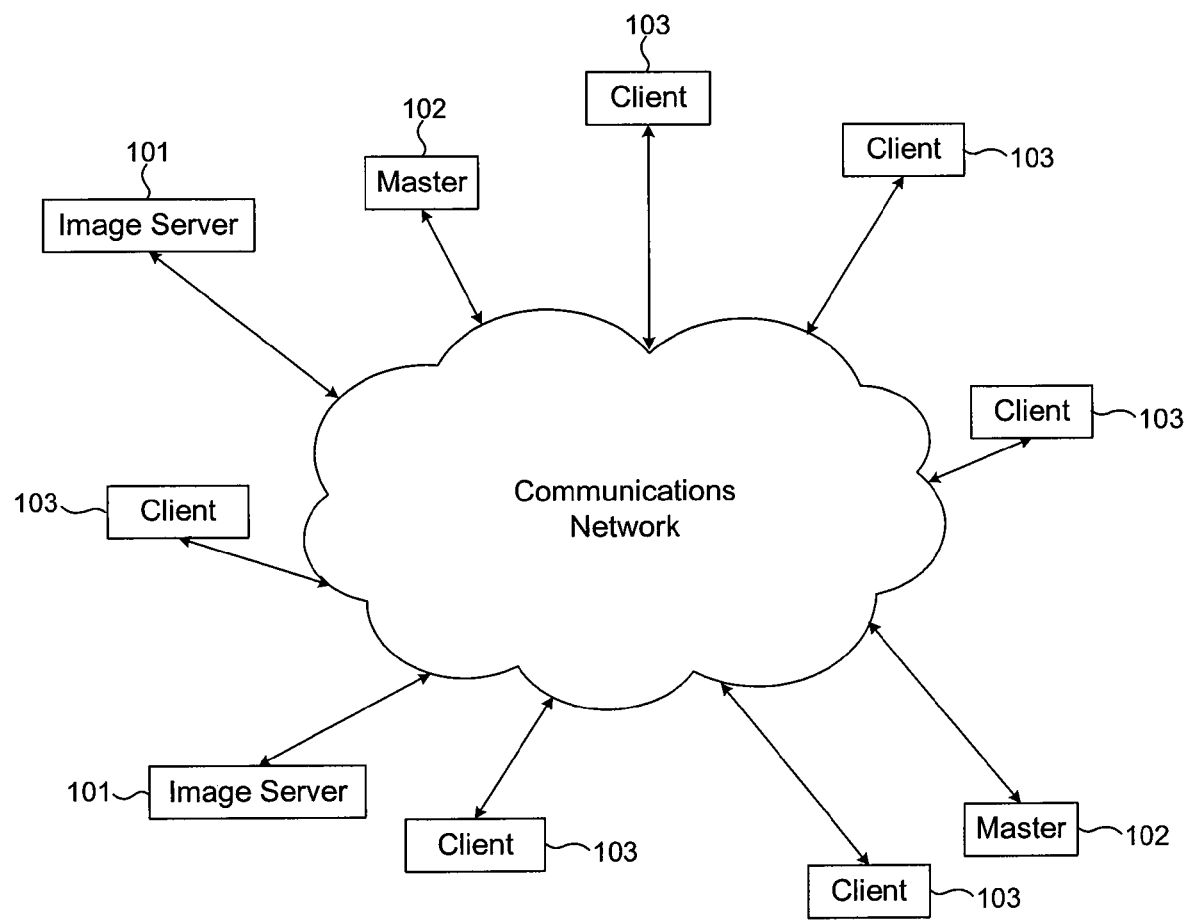
FIG. 1 illustrates clients, masters, and image servers interconnected by a communications network in accordance with an aspect of the embodiments.

FIG. 1 illustrates clients 103, masters 102, and image servers 101 interconnected by a communications network 104 in accordance with an aspect of the embodiments. The communications network 104 is used by computers to communicate with one another. Examples of communications networks are the Internet and the local computer networks in compute clusters. The clients 103, masters 102, or image servers 101 are computers that can use the communications network 104 to communicate with one another as well as any other computers that are also connected to the communications network.

Figure 2:
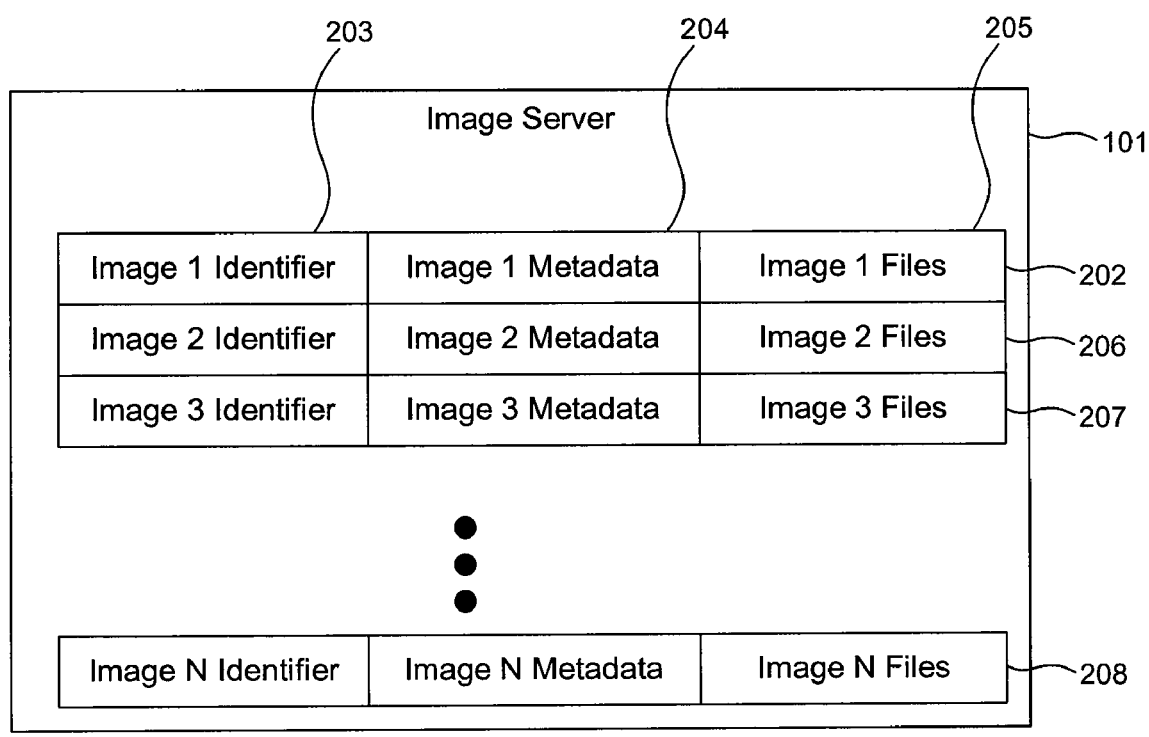
FIG. 2 illustrates an image server storing images in accordance with an aspect of the embodiments.

FIG. 2 illustrates an image server 101 storing images in accordance with an aspect of the embodiments. The first image 202 is shown as including the first image identifier 203, the first image metadata 204 and the first image files 205. An image can contain other data as well. The first image identifier 203 is a name or label, such as "Bob's_old_filesystem" or "image7of9_version19411207". The important criterion for such an identifier is that it refers to only one image, although one image can have multiple identifiers. The image metadata will be discussed below. The first image 202 also includes a set of files called the first image files 205. The image server 101 is shown containing more than one image. It also contains the second image 206, third image 207, and so on. In all, it can contain N images, as indicated by the Nth image 208, where N is a nonnegative number. The images are also shown stored separately, which is not necessarily the case. The images can also be stored and accessed via a revision control system.

Figure 3:
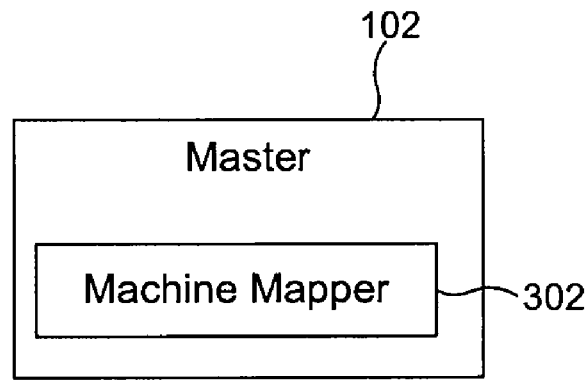
FIG. 3 illustrates a master with a machine mapper in accordance with an aspect of the embodiments.

FIG. 3 illustrates a master 102 with a machine mapper 302 in accordance with an aspect of the embodiments. The machine mapper 302 is used to specify each cumulative image, the cumulative image associated with each client, and the filter to apply to the cumulative image and to the client's effective image.

Figure 4:
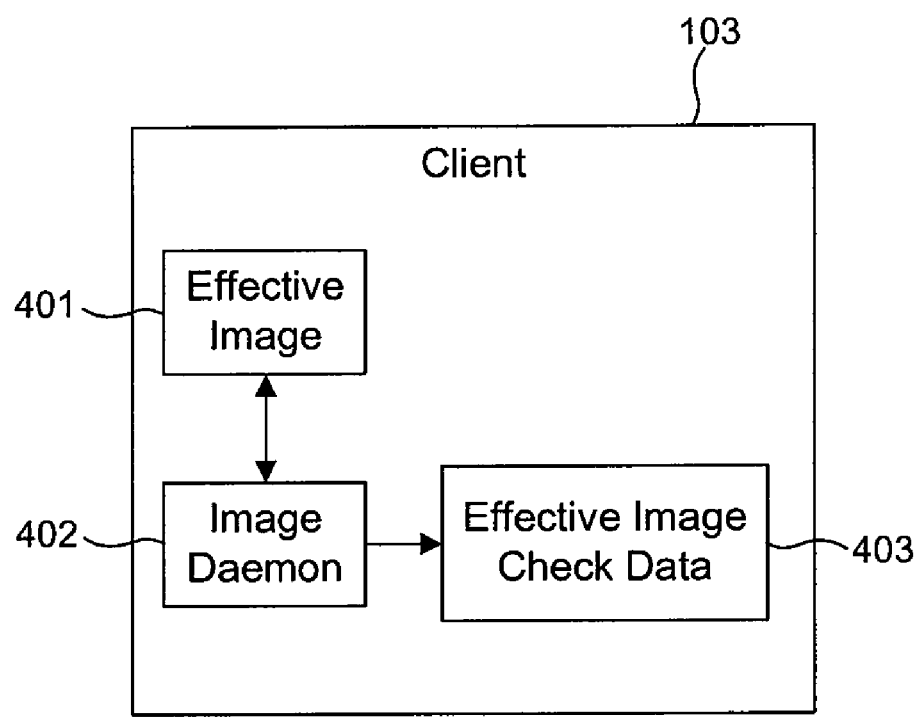
FIG. 4 illustrates a client in accordance with an aspect of the embodiments.

FIG. 4 illustrates a client 103 in accordance with an aspect of the embodiments. Every client 103 has an effective image 401 stored in memory. As discussed above, a cumulative image can be assembled using a client image specification and images. The cumulative image can then be loaded into a client's memory at which time it becomes the client's 103 effective image 401. The client 103 can also contain an image daemon 402 and effective image check data 403. The image daemon 402 continuously scans the files in the effective image 401 to produce checksums that are recorded in the effective image check data 403. In certain embodiments, it can be advantageous for computers other than clients 103 to execute the image daemon 402 and store the effective image check data 403. In those embodiments, the image daemon 402 must access the effective image 401 in the client memory by way of the communications network 104.

Figure 5:
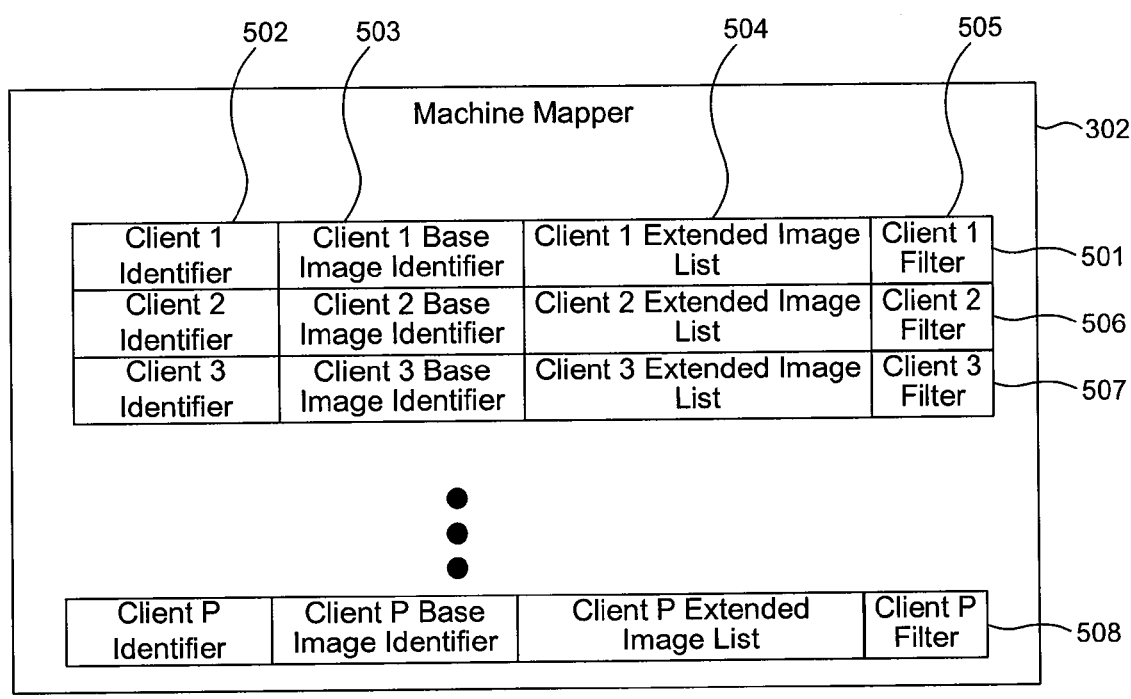
FIG. 5 illustrates a machine mapper in accordance with an aspect of the embodiments.

FIG. 5 illustrates a machine mapper 302 in accordance with an aspect of the embodiments. The machine mapper 302 contains client image specifications to track or determine exactly which files should be present on a client 103. The first client image specification 501 can include the first client identifier 502, first client base image identifier 503, first client extended image list 504, first client filter 505, and possibly other data. The first client identifier 502 is associated with a specific client computer.

The machine mapper 302 is shown containing a second client image specification 506, third client image specification 507, and so on through the Pth client image specification 508. As such, the machine mapper contains client image specifications for P different client computers. P is a number greater than 0. Uses of client image specifiers are discussed below. An image identifier, as discussed above, can be used to obtain the image itself from an image server. The client image specification contains one image identifier to identify the base image, and a list of zero or more image identifiers to identify the extended images.

Figure 6:
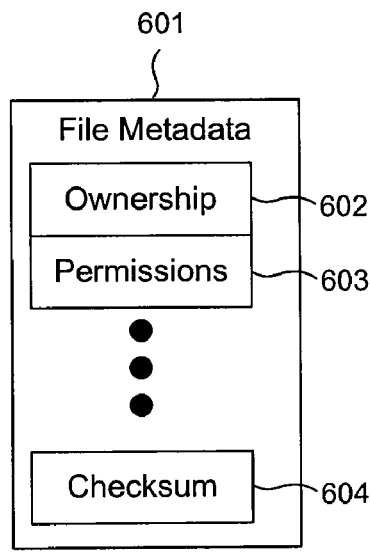
FIG. 6 illustrates file metadata in accordance with an aspect of the embodiments.

FIG. 6 illustrates file metadata 601 in accordance with an aspect of the embodiments. Files contain data. File metadata 601, as discussed above, is information about a file such as ownership 602, permissions 603, and a checksum 604. The checksum 604 can be intended as a secure checksum, such as producing using MD-5, SHA-1, SHA-224, or one of the other cryptographic hash functions. In addition, if the administrators determine that intrusion is not a possibility, and the added cost of computing a cryptographically secure hash for all files is prohibitive, a non-cryptographically-secure hash function can be used instead.

Figure 7:
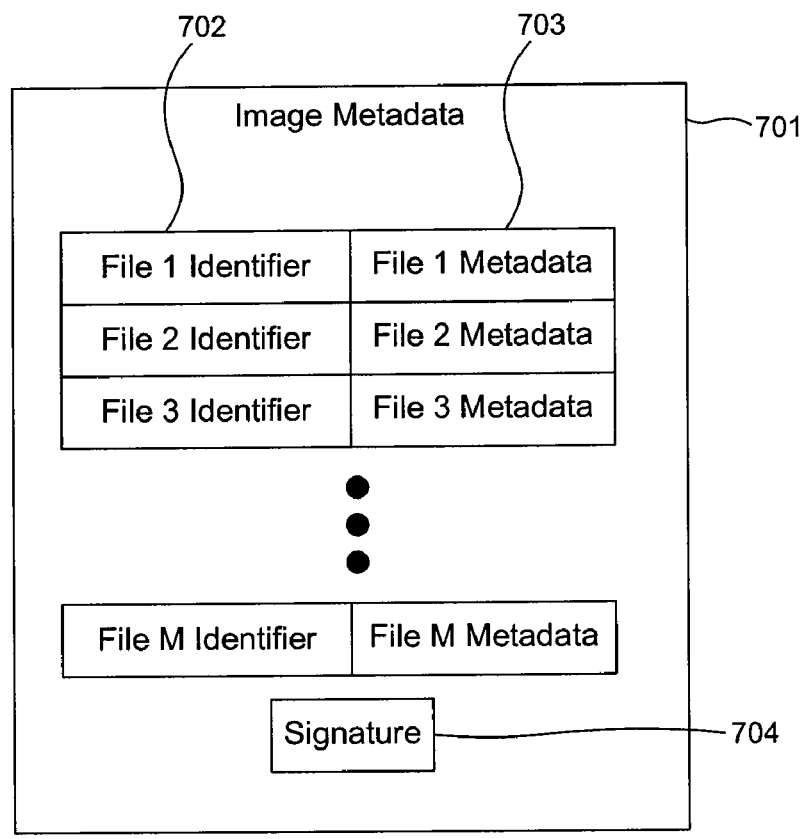
FIG. 7 illustrates image metadata in accordance with an aspect of the embodiments.

FIG. 7 illustrates image metadata 701 in accordance with an aspect of the embodiments. Every file in an image needs a file name or some other kind of label or identifier because otherwise there is no way to refer to it. For example, the first file shown in the image metadata 701 has the file identifier 702. An example of a file identifier is "AssimilatorPatentApplication". Each file also has file metadata 601 as discussed above. The first file has first file metadata 703. Referring back to FIG. 2, the first image 202 has first image metadata 204. Notice that the image metadata 701 does not include the files themselves. The files are contained elsewhere in the image, as seen by the first image files 205 contained in the first image 202.

Image metadata 701 can also contain a digital signature 704. Digital signatures are essentially stamps of authenticity that can be attached to data such as images and files. For example, an administrator on deciding that an image is correct and ready for distribution can digitally sign it. The digital signature is then used by others to affirm that the administrator approved and the data in the image has not changed.

Figure 8:
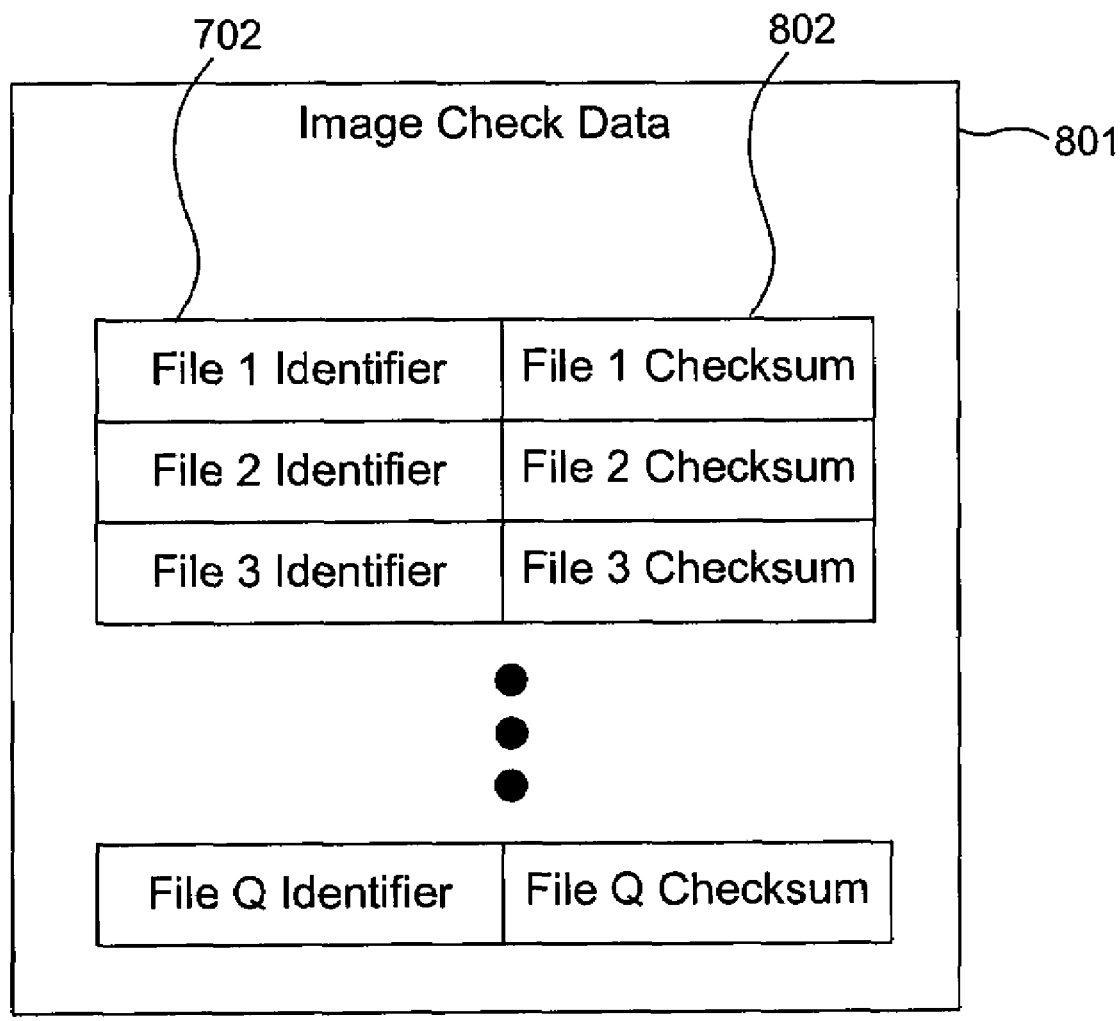
FIG. 8 illustrates image check data in accordance with an aspect of the embodiments.

FIG. 8 illustrates image check data 801 in accordance with an aspect of the embodiments. Image check data 801 is similar in form to image metadata 701. Image check data associates a checksum with every file. For the first file, a first file identifier 702 is associated with the first file checksum 802. Checksums have already been discussed.

Process Flows

Figure 9:
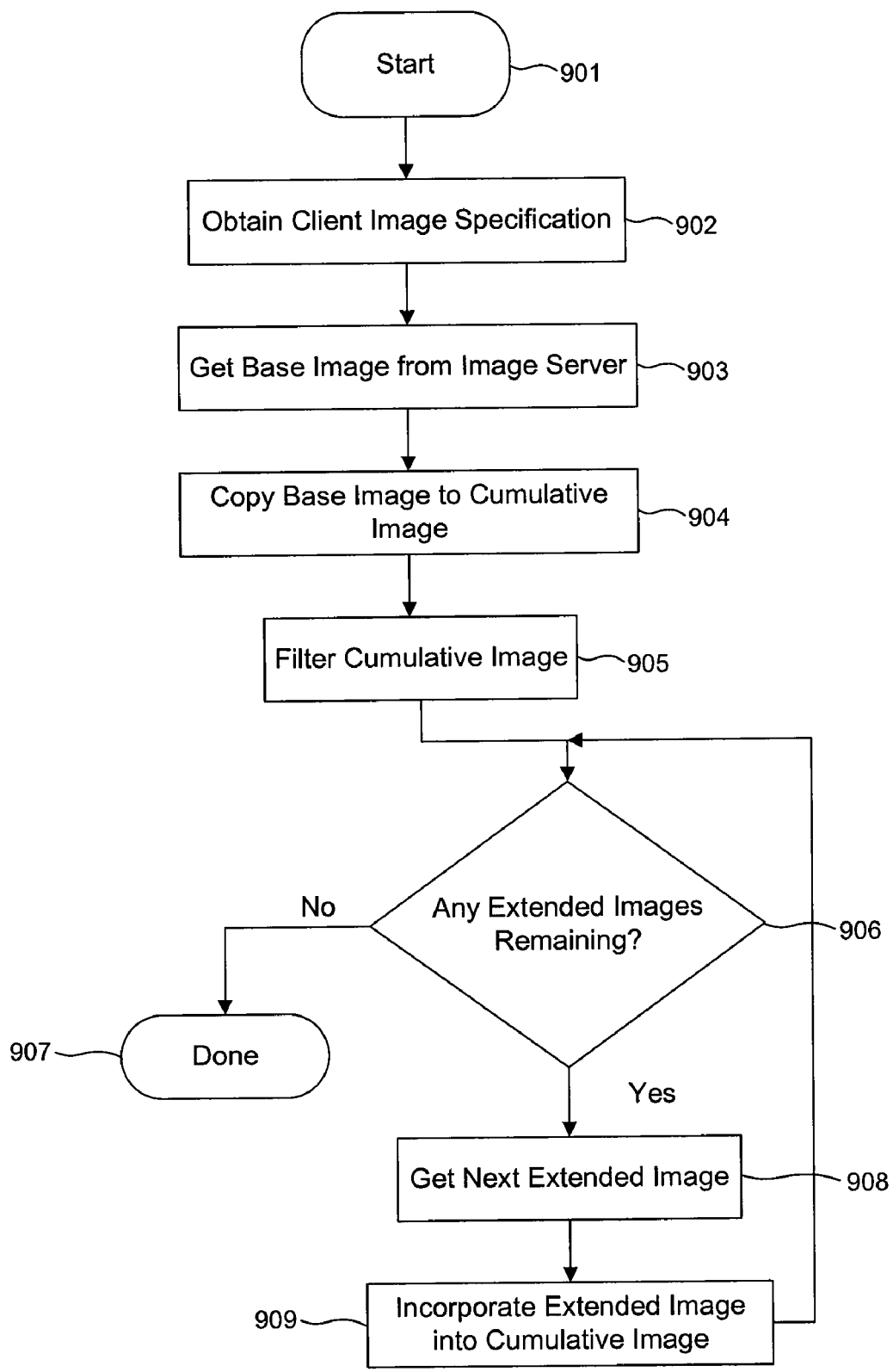
FIG. 9 illustrates a high level flow diagram of the assembly of a cumulative image in accordance with an aspect of the embodiments.

FIG. 9 illustrates a high level flow diagram of the assembly of a cumulative image in accordance with an aspect of the embodiments. After starting 901 the client image specification is obtained 902. As illustrated in FIG. 5, a client image specification has a base image identifier, an extended image list, and a client filter. Using the base image identifier, the base image is obtained. The base image can be obtained from an image server 903 or the master's own memory. The master, however, often stores image identifiers and image metadata, but not image files. After it is obtained, the base image is copied to the cumulative image 904. Next, the cumulative image is filtered 905 as discussed in detail later. The extended image list is now examined to see if any image identifiers are on the list 906. If not, then cumulative image assembly is done 907. Otherwise, the next extended image is obtained 908. After an extended image is obtained 908, it is incorporated into the cumulative image 909. The order in which extended images are integrated is important. Therefore, the first extended image on the list is obtained first, then the next, and so forth. As such, after incorporating an extended image, the process loops back to checking the list for more.

Figure 10:
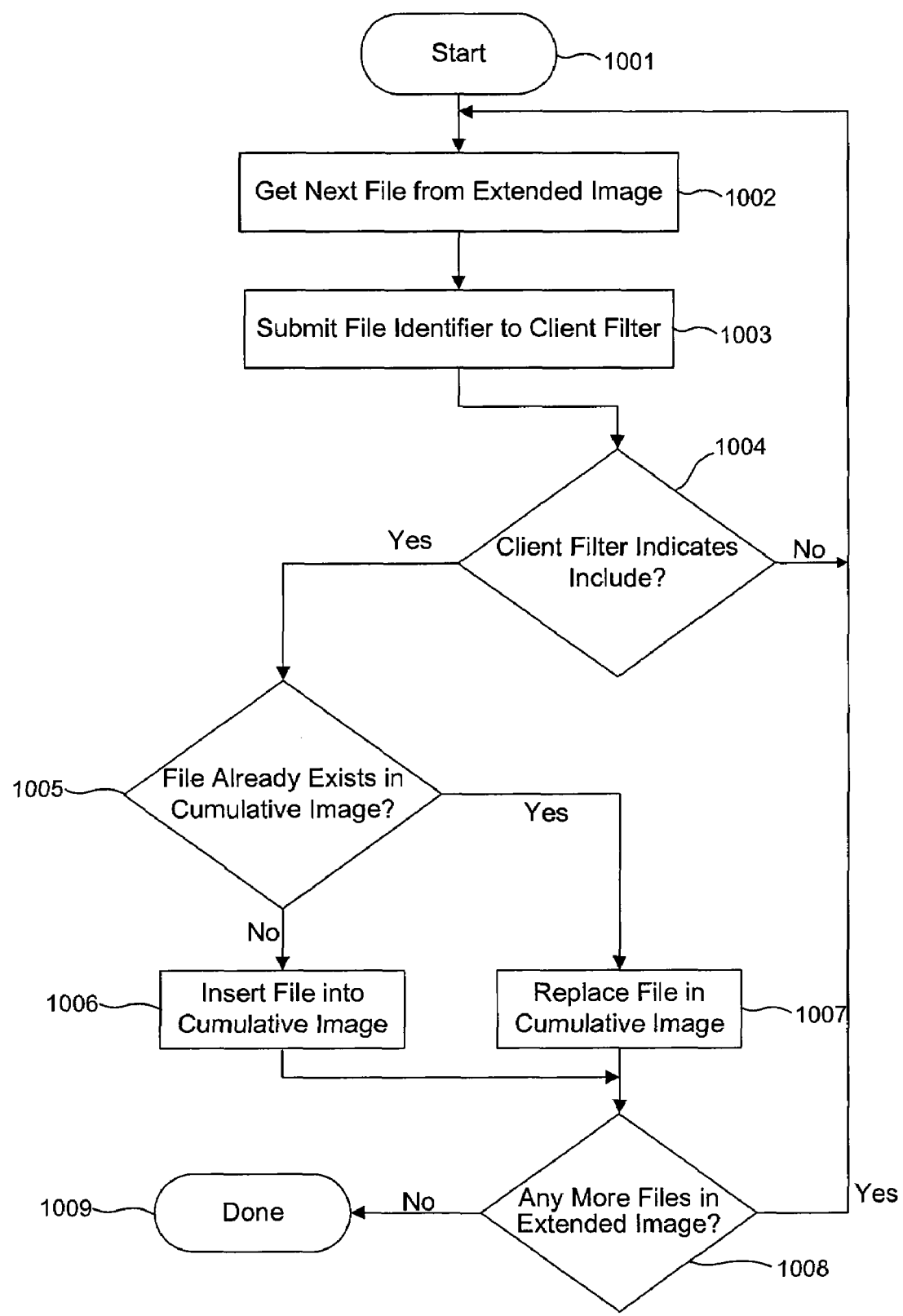
FIG. 10 illustrates a high level flow diagram of incorporating an extended image into a cumulative image in accordance with an aspect of the embodiments.

FIG. 10 illustrates a high level flow diagram of incorporating an extended image into a cumulative image in accordance with an aspect of the embodiments. After starting 1001, the first file, which is the next file the first time through, is obtained from the extended image 1002. Recall that a client filter can be obtained as part of the client image specification. The file identifier is submitted to the client filter 1003 and the client filter indicates if the file should be included 1004. If the client filter does not indicate that the file should be included, then the process loops back to getting the next file 1002. If the file should be included, then the cumulative image is checked to see if it already contains the file 1005. If the cumulative image does not already include the file, then the file is inserted into it 1006. Otherwise, the version of the file already included in the cumulative image is replaced by the version obtained from the extended image 1007. If there are more files to process 1008, the process loops back to getting the next file 1002. Otherwise, the process is done 1009. There are other slightly different methods of implementing this process, such as first including all files in the image and then filtering the image using the client filter as will be discussed below. These algorithms may be used interchangeably. Furthermore, image filtering can occur on any computer that has access to the client filter and to the image. For example, another way of doing this is to not filter files on the master at all, but to send the entire image to every client, and have the client filter the files.

Figure 11:
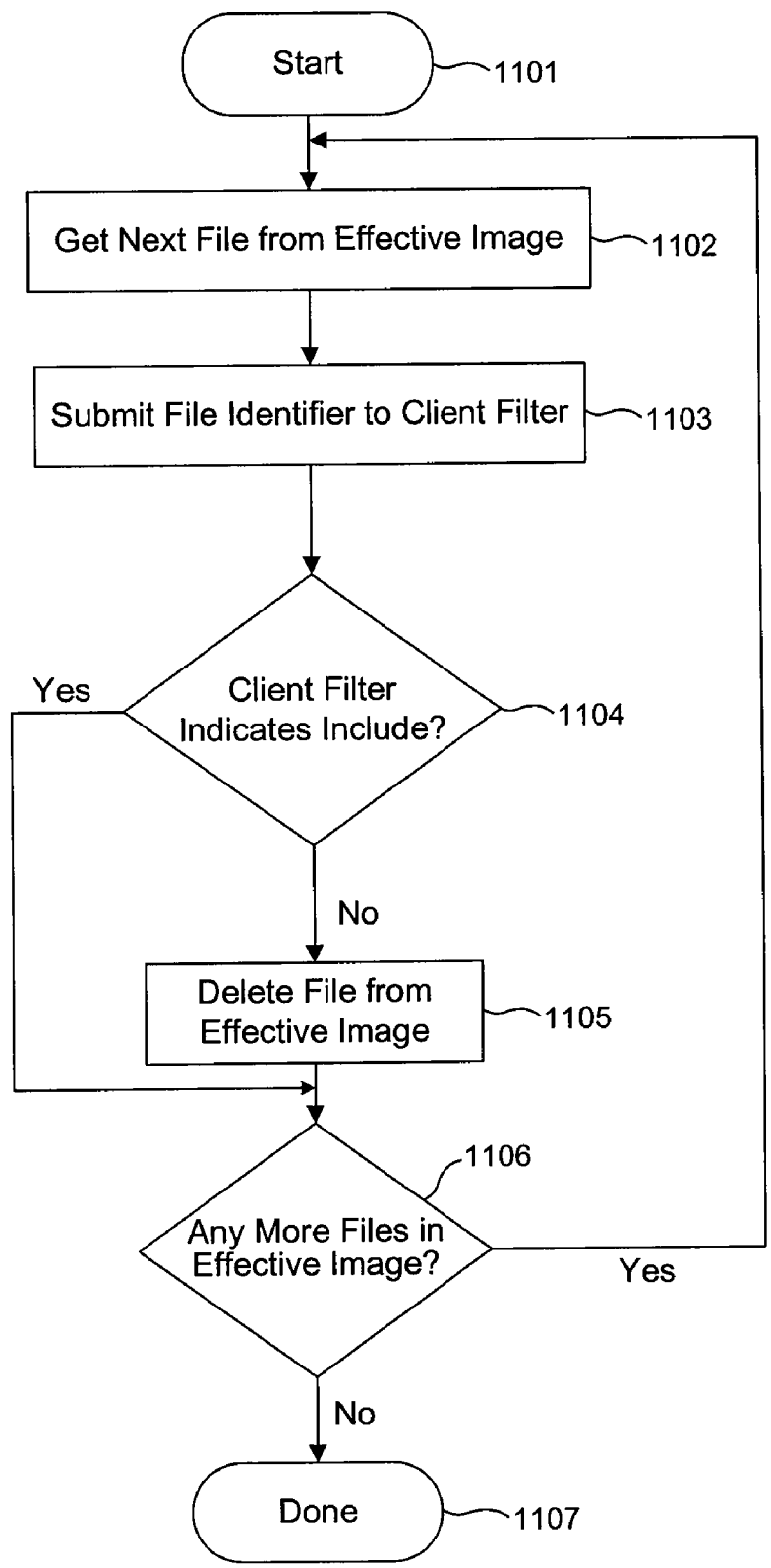
FIG. 11 illustrates a high level flow diagram of filtering an image 905 in accordance with an aspect of the embodiments.

FIG. 11 illustrates a high level flow diagram of filtering an image 905 in accordance with an aspect of the embodiments. After the start 1101, the next file, or the first file on the first time through the loop, is obtained from the image 1102. The file identifier is submitted to the client filter 1103 and if the client filter indicates that the file should not be included 1104, the file is deleted from the image 1105. Next, whether the file was deleted or not, the image is checked for more files 1106. If there are none, the process is done 1107. Otherwise the process loops back to obtaining the next file from the image 1102.

If the client image specification does not include a client filter then the client filter checks in the high level flow diagrams that are not performed and the default action is to include every file. Furthermore, notice that the files in the extended images overwrite files in the cumulative image if both files have the same file identifier. The overwriting property has a side effect that the order in which extended images are incorporated into the cumulative image is important, as described above. The order of files in the extended image list must be preserved and respected.

Figure 12:
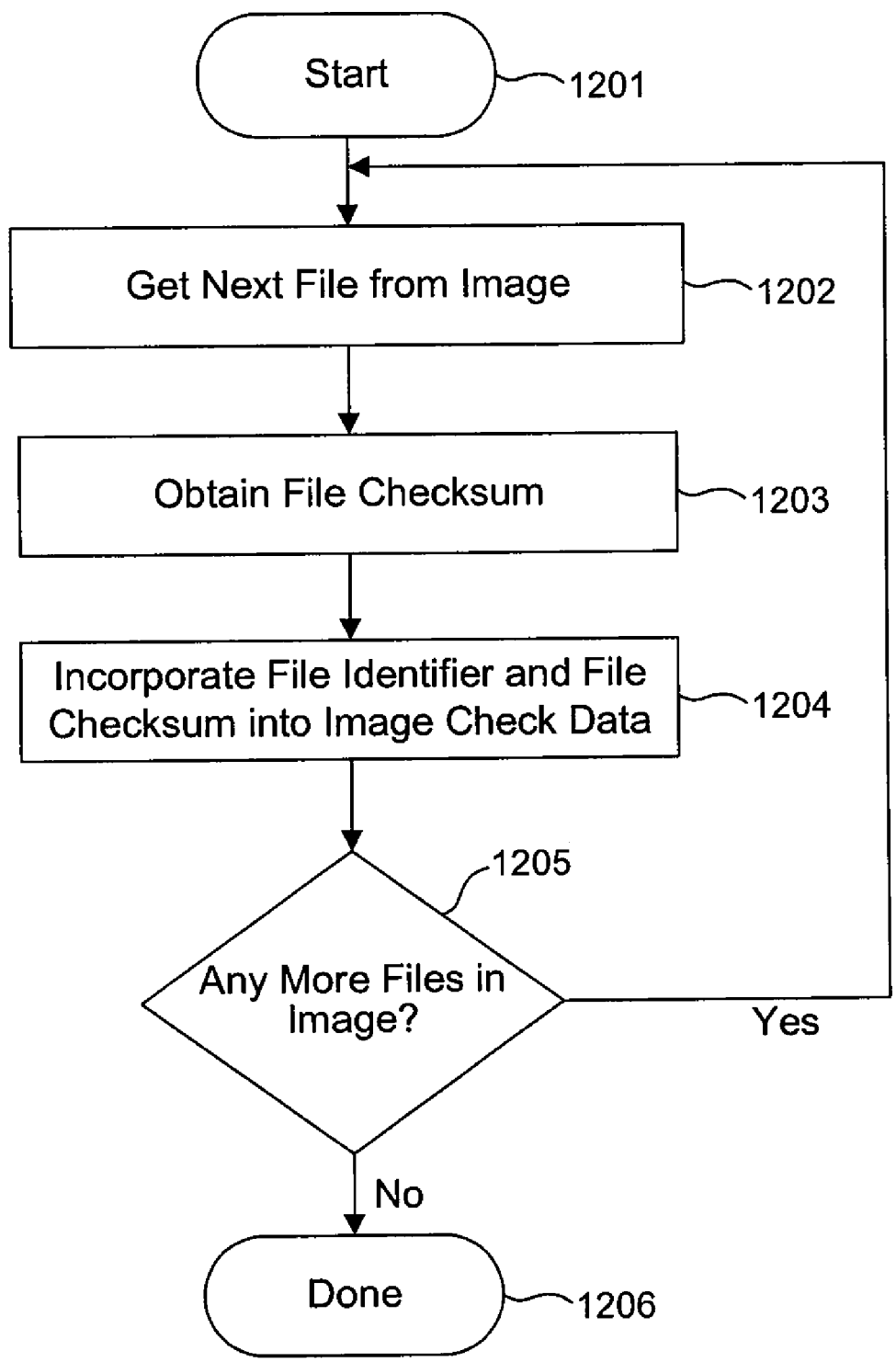
FIG. 12 illustrates a high level flow diagram of accumulating effective image check data in accordance with an aspect of the embodiments.

FIG. 12 illustrates a high level flow diagram of accumulating image check data in accordance with an aspect of the embodiments. Image check data 801 contains file identifiers and file checksums. After the start 1201 the first file, or next file after the first time through the loop, is obtained from the image 1202. Recall that a file can be a regular file, directory file, special file, or other type of file. Next the file checksum is obtained 1203. If the image is an effective image then the checksum should be calculated. If the image is a cumulative image then, although it can be calculated, the checksum is usually read from the image metadata because masters rarely contain the image files from which a checksum can be calculated. The file checksum and file identifier are incorporated into the image check data 1204 and then the process checks to see if there are more files in the image 1205. If there are not, the process is done 1206. Otherwise the process loops back and gets the next file 1202. The daemon process 402 mentioned earlier can follow a process flow similar to this one to continually produce and update effective image check data. However, the daemon's work is never done. There is always another file for the daemon to process. The daemon can choose files to process by walking the directory tree, repeatedly running through a list, choosing files randomly, choosing them by some other metric such as how likely the file is to have been changed, or some other method, as long as new files are discovered, and old files that have been deleted are noticed as well.

The difference between cumulative image check data and effective image check data is that effective image check data is accumulated using the possibly corrupt effective image located in client memory while cumulative image check data is accumulated from uncorrupted images stored on image servers or uncorrupted data stored on masters. Another difference is that cumulative image check data can cover a subset of the files in the cumulative image.

Using a process such as that illustrated in FIG. 9, a master 102 can assemble a cumulative image from a client image specification based on the images on an image server. The master can use a process such as that shown in FIG. 12 to accumulate cumulative image check data. The only difference is that the file identifier and file checksum are incorporated into cumulative image check data instead of effective image check data. If the file metadata 601 includes a checksum 604, then the image metadata 204 can include a checksum for every file in the image. In this case, the master does not need to assemble a cumulative image but can accumulate cumulative image check data directly from the image metadata. On consideration of the information disclosed here, one practiced in the art of computer programming can implement image check data accumulation via numerous other adaptations of the high level flows.

Cumulative image check data and effective image check data can be filtered by a process similar to that illustrated in FIG. 11. The only difference is that instead of deleting the file from the image 1105, the checksum and file identifier are deleted from the check data. Filtering the cumulative image check data results in filtered cumulative check data.

Filtering effective image check data results in filtered effective image check data. Every file identifier and associated checksum in the filtered cumulative image check data should have a corresponding entry in the filtered effective image check data. Similarly, every file identifier and associated checksum in the filtered effective image check data should have a corresponding entry in the filtered cumulative image check data.

Figure 13:
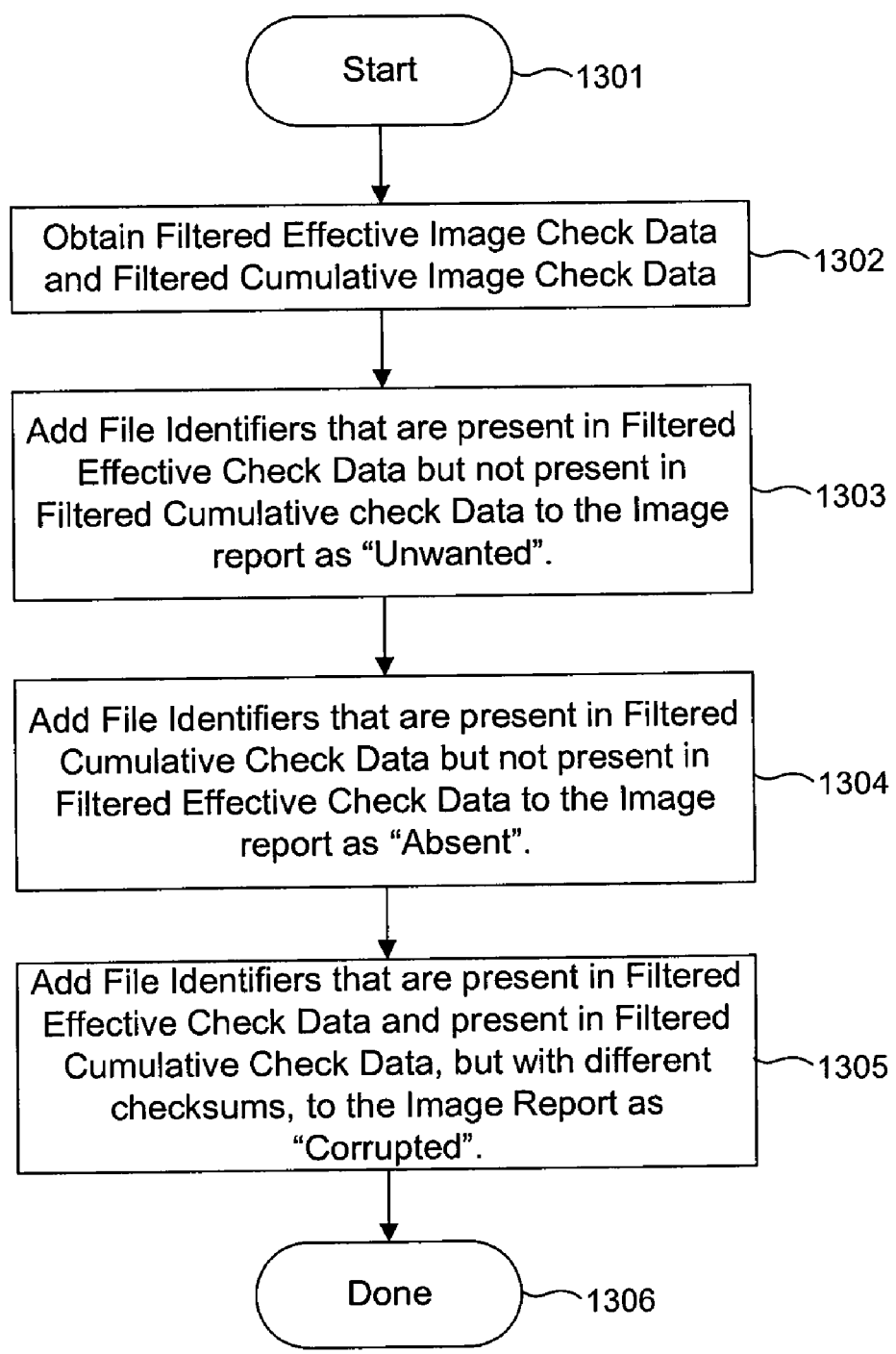
FIG. 13 illustrates a high level flow diagram of creating an image report in accordance with an aspect of the embodiments.

FIG. 13 illustrates a high level flow diagram of creating an image report in accordance with an aspect of the embodiments. After the start 1301, the filtered effective image check data and the filtered cumulative image check data are obtained 1302. Next, file identifiers that are present in the filtered effective check data but not in the filtered cumulative check data are added to the image report as "unwanted" 1303. In other words, a file that should not be present exists in a client's effective image. File identifiers that are present in the filtered cumulative check data but not in the filtered effective check data are added to the image report as "absent" 1304. File identifiers that are present in the filtered effective check data and in the filtered cumulative check data but with different checksums are added to the image report as "corrupted" 1305. Finally, the process is done 1306.

Figure 14:
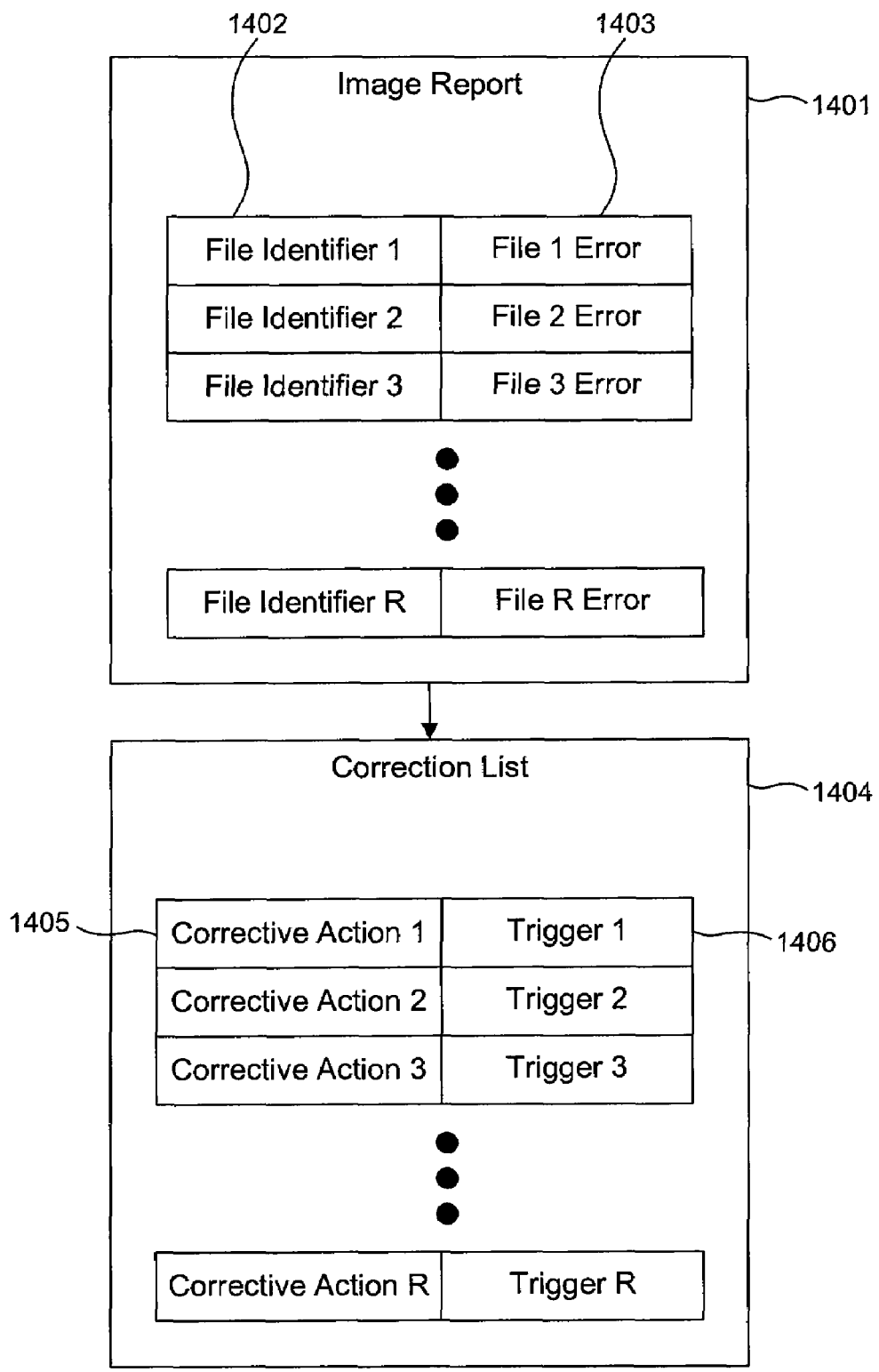
FIG. 14 illustrates creating a correction list from an image report in accordance with an aspect of the embodiments.

FIG. 14 illustrates creating a correction list from an image report in accordance with an aspect of the embodiments. The image report 1401 contains a first file identifier 1402 and the first file error 1403. The file error can be "corrupted", "absent", "unwanted" or some other meaningful information. If there are R errors, where R is a positive number, then the image report contains R entries. Each file identifier included in the image report 1401 can result in a corrective action in the correction list 1404. File identifier 1 1402 results in corrective action 1 1405. Corrective action 1 1405 is associated with trigger 1 1406. The trigger is a series of instructions, such as a computer program, that can be executed after the corrective action is completed.

Another action that can be taken after correcting a file that was absent or corrupted is to immediately validate that the file is now correct. As discussed above, validation can be performed by calculating the file's checksum and comparing the calculated checksum to a correct checksum. If the checksums match then the file has been properly corrected. If they do not match, then the file has not been properly corrected. If a file is not properly corrected, then another attempt can be immediately made to correct it or the error can be added to a correction list for later correction.

There are many types of corrective action possible. For example, a client 103 containing cumulative image check data 403 can receive image check data 801 from a master 102 and use it to create an image report 1401. The client 103 can send the image report 1401 back to the master 102 where it is used to create a correction list 1404. The correction list 1404 can be sent back to the client 103 where each corrective action is taken and triggers are executed as required. A corrective action can include instructions for the client 103 to obtain a new copy of the corrupted file from a source. The source can be another client 103, an image server 101, or any other source thought to have a good copy. In addition, the master server can request that the client fix a subset of the errors that it reports. As discussed above, there are many methods known in the arts of computer networking and computer administration for downloading data and files. Some of those methods can be secure methods. An example of a secure method is for the corrective action to include a digitally signed datum, known as a ticket, that sources can require from the client 103. In this manner, only clients 103 with permission can download data. Tickets can be generated that are valid for a limited time, such as an hour.

Embodiments can be implemented in the context of modules. In the computer programming arts, a module (e.g., a software module) can be implemented as a collection of routines and data structures that perform particular tasks or implement a particular abstract data type. Modules generally can be composed of two parts. First, a software module may list the constants, data types, variables, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term "module", as utilized herein generally refers to software modules or implementations thereof. Such modules can be utilized separately or together to form a program product that can be implemented through signal-bearing media, including transmission media and recordable media.

The examples discussed above are intended to illustrate aspects of the embodiments. The phrases "an embodiment" or "one embodiment" do not necessarily refer to the same embodiment or any specific embodiment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
storing at least one image on at least one image server wherein the at least one image comprises an image identifier, image metadata, and at least one image file;
obtaining at least one client image specification, creating the at least one cumulative image from the at least one image based on the at least one client image specification, and loading the at least one cumulative image as at least one effective image on at least one client;
creating at least one cumulative image check data based on the at least one client image specification and the at least one image and sending the at least one cumulative image check data to the at least one client;
generating at least one effective image check data;
recording differences between the at least one cumulative image check data and the at least one effective image check data in at least one image report;
sending the at least one image report to a master;
the master compiling at least one correction list;
sending the at least one correction list to the at least one client, and the at least one client repairing the at least one effective image based on the at least one correction list; and
executing a set of triggered instructions upon the completion of the repairing of the at least one effective image based on the at least one correction list.

2. The method of claim 1 further comprising generating the at least one effective image check data by continuously monitoring the at least one effective image that is loaded on the at least one client.

3. The method of claim 2 wherein an image daemon located on the at least one client generates the at least one effective image check data.

4. The method of claim 1 further comprising the at least one client receiving the at least one correction as a TORRENT file (torrent).

5. The method of claim 1 further comprising the at least one client receiving each of the at least one correction from a single trusted source.

6. The method of claim 1 wherein the at least one correction list further comprises the set of triggered instructions.

7. The method of claim 1 further comprising
triggering a set of instructions upon the failure of the repairing of the at least one effective image based on the at least one correction list.

8. A method comprising:
storing at least one image on at least one image server wherein the at least one image comprises an image identifier, image metadata, and at least one image file;
obtaining at least one client image specification, creating at least one cumulative image from the at least one image based on the at least one client image specification, and loading the at least one cumulative image as at least one effective image on at least one client;
generating at least one effective image check data and sending the at least one effective image check data to a master;
creating at the master at least one cumulative image check data based on the at least one image and the at least one client image specification;
recording at the master differences between the at least one cumulative image check data and the at least one effective image check data in at least one image reports
the master compiling at least one correction list;
sending the at least one correction list to the at least one client and the at least one client repairing the at least one effective image based on the at least one correction list; and
executing a set of triggered instructions upon the completion of the repairing of the at least one effective image based on the at least one correction list.

9. A system comprising:
at least one image server wherein each of the at least one image server comprises at least one image, wherein each of the at least one image comprises an image identifier, image metadata and at least one image file and each of the at least one image server can create at least one cumulative image from at least one image based on at least one client image specification;
at least one client, implemented using a computer, comprising at least one cumulative image loaded from the at least one image server as an effective image;
at least one image daemon that produces at least one effective image check data based on the at least one effective image;
at least one cumulative image check data that can be produced from the at least one image and the at least one client image specification, wherein the at least one cumulative image check data can be sent to the at least one client; and
at least one image report that details the differences between the at least one effective image check data and the at least one cumulative image check data;

at least one master that receives the at least one image report, compiles at least one correction list based on the at least one image report, and sends the at least one correction list to the at least one client, wherein the at least one client repairs the at least one effective image based on the at least one correction list; and
at least one trigger that causes a set of triggered instructions to execute upon the completion of the repairing of the at least one effective image based on the at least one correction list.

10. The system of claim 9 wherein the at least one client obtains the at least one cumulative image check data from the at least one master and the at least one client assembles the at least one image report.

11. The system of claim 9, wherein the at least one master comprises a machine mapper that can supply the at least one client specification for the at least one client.

12. A system comprising:
a means of storing at least one image wherein the at least one image comprises an image identifier, image metadata, and at least one image file;
a means of supplying at least one client image specification;
a means of creating at least one cumulative image from the at least one image based on the at least one client image specification;
a means of loading the at least one cumulative image as at least one effective image on at least one client;
a means of creating at least one cumulative image check data based on the at least one client image specification and the at least one image;
a means of sending the at least one cumulative image check data to the at least one client;
a means of generating at least one effective image check data;
a means of recording differences between the at least one cumulative image check data and the at least one effective image check data in at least one image reports
a means of sending the at least one image report to a master;
a means of compiling at least one correction list with the master;
a means of sending the at least one correction list to the at least one client;
a means of repairing the at least one effective image based on the at least one correction list; and
a means of executing a set of triggered instructions upon the completion of the repairing of the at least one effective image based on the at least one correction list.

13. A method comprising:
storing at least one image on at least one image server wherein the at least one image comprises an image identifier, image metadata, and at least one image file;
obtaining at least one client image specification wherein the at least one client image specification comprises an extended image list and a base image identifier;
creating at least one cumulative image from a base image stored on the at least one image server using the base image identifier and from at least one extended image using the extended image list, and sending the at least one cumulative image to at least one client;
creating at least one cumulative image check data based on the at least one client image specification, the base image, and the at least one extended image and sending the at least one cumulative image check data to the at least one client;
generating at least one effective image check data;

recording differences between the at least one cumulative image check data and the at least one effective image check data in at least one image report;

sending the at least one image report to a master;

the master compiling at least one correction list;

sending the at least one correction list to the at least one client, and the at least one client repairing the at least one effective image based on the at least one correction list; and executing a set of triggered instructions upon the completion of the repairing of the at least one effective image based on the at least one correction list.

14. The method of claim 13, further comprising generating at least one effective image check data, recording differences between the at least one cumulative image check data and the at least one effective image check data in at least one image report.

15. The method of claim 13, wherein the at least one client image specification further comprises a client filter and wherein the creating at least one cumulative image further comprises using the client filter to determine whether at least one file from the at least one extended image will be included in the at least one cumulative image.

16. A method comprising:

storing at least one image on at least one image server wherein the at least one image comprises an image identifier, image metadata, and at least one image file;

obtaining at least one client image specification, creating the at least one cumulative image from the at least one image based on the at least one client image specification, and loading the at least one cumulative image as at least one effective image on at least one client;

creating at least one cumulative image check data based on the at least one client image specification and the at least one image and sending the at least one cumulative image check data to the at least one client;

generating at least one effective image check data;

recording differences between the at least one cumulative image check data and the at least one effective image check data in at least one image report;

sending the at least one image report to a master;

the master compiling at least one correction list, sending the at least one correction list to the at least one client, and the at least one client repairing the at least one effective image based on the at least one correction list, wherein the at least one correction list comprises at least one correction that comprises data and instructions; and the at least one client receiving each of at least one correction from a single trusted source based on the at least one correction list.

* * * * *

UNITED STATES PATENT AND TRADEMARK OFFICE
CERTIFICATE OF CORRECTION

PATENT NO. : 7,542,992 B1
APPLICATION NO. : 11/194230
DATED : June 2, 2009
INVENTOR(S) : Pandurangan et al.

It is certified that error appears in the above-identified patent and that said Letters Patent is hereby corrected as shown below:

Title Page, item (56)
Please include all references (U.S. Patent Documents A-G and Non-Patent Documents U-W) cited in Notice of References Cited dated April 30, 2009 (listed below).

U.S. PATENT DOCUMENTS

|   | Document Number<br>Country Code-Number-Kind-Code | Date<br>MM-YYYY | Name | Classification |
|---|---|---|---|---|
| A | US-2003/0004882 A1 | 01-2003 | Holler et al. | 705/51 |
| B | US-2004/0044727 A1 | 03-2004 | Abdelaziz et al. | 709/203 |
| C | US-2005/0132070 A1 | 06-2005 | Redlich et al. | 709/228 |
| D | US-2005/0198061 A1 | 09-2005 | Robinson et al. | 707/102 |
| E | US-7,124,305 B2 | 10-2006 | Margolus et al. | 713/193 |
| F | US-2008/0177994 A1 | 07-2008 | Mayer, Yaron | 713/2 |
| G | US-5,596,565 | 01-1997 | Yonemitsu et al. | 714/800 |

NON-PATENT DOCUMENTS
Include as applicable: Author, Title Date, Publisher, Edition or Volume, Pertinent Pages U     Lampe et al, "DATA MINING: AN IN-DEPTH LOOK", Mar 2004, Internal Auditing, Vol. 19, Iss. 2, P. 1-13 <Retrieved from ProQuest 23 Mar 2009>.

V     Tang et al, "Differentiated Object Placement and Location for Self-Organizing Storage Clusters", 2002, www.cs.ucsb.edu/research/trcs/docs/2002-32.pdf, <Retrieved from CiteSeer 23 Mar 2009>.

W     Chaffey, "Design and Implementation Factors in Image Retrieval Across a Wide Area Network—A Commercial Example", Oct 1996, International Journal of Information Management, Vol. 16, No. 5, P. 381-390, <Retrieved from ScienceDirect.com 23 Mar 2009>.

Signed and Sealed this
Sixteenth Day of August, 2011

David J. Kappos
*Director of the United States Patent and Trademark Office*

CERTIFICATE OF CORRECTION (continued)
U.S. Pat. No. 7,542,992 B1

In Claim 8, Column 11, Line 37, please replace "image reports" with --image report--.

In Claim 12, Column 12, Line 38, please replace "image reports" with --image report--.

In Claim 16, Column 14, Line 25, please replace "correction list." with --correction list; executing a set of triggered instructions upon the completion of the repairing the at least one effective image based on the at least one correction list.--.